United States Patent
Yang et al.

(10) Patent No.: US 11,561,719 B2
(45) Date of Patent: Jan. 24, 2023

(54) FLASH MEMORY CONTROL METHOD OF RE-PROGRAMMING MEMORY CELLS BEFORE ERASE OPERATIONS, FLASH MEMORY STORAGE DEVICE AND FLASH MEMORY CONTROLLER

(71) Applicant: PHISON ELECTRONICS CORP., Miaoli (TW)

(72) Inventors: Yu-Siang Yang, New Taipei (TW); Wei Lin, Taipei (TW); An-Cheng Liu, Taipei (TW); Yu-Heng Liu, Hsinchu County (TW); Chun-Hsi Lai, Hsinchu County (TW); Ting-Chien Zhan, Hsinchu (TW)

(73) Assignee: PHISON ELECTRONICS CORP., Miaoli (TW)

( * ) Notice: Subject to any disclaimer, the term of this patent is extended or adjusted under 35 U.S.C. 154(b) by 21 days.

(21) Appl. No.: 17/242,240

(22) Filed: Apr. 27, 2021

(65) Prior Publication Data

US 2022/0334723 A1     Oct. 20, 2022

(30) Foreign Application Priority Data

Apr. 16, 2021 (TW) ................................. 110113805

(51) Int. Cl.
  *G06F 3/06* (2006.01)
(52) U.S. Cl.
  CPC ............ *G06F 3/065* (2013.01); *G06F 3/0604* (2013.01); *G06F 3/0679* (2013.01)

(58) Field of Classification Search
  CPC .. G06F 3/0679; G06F 3/0652; G06F 12/0253; G06F 12/0246
  (Continued)

(56) References Cited

U.S. PATENT DOCUMENTS

| 2015/0134887 A1* | 5/2015 | Liang .................. G06F 12/0246 711/103 |
| 2017/0038977 A1* | 2/2017 | Yeh ....................... G06F 3/0688 |

(Continued)

FOREIGN PATENT DOCUMENTS

| CN | 110780802 | 2/2020 |
| TW | 201329988 | 7/2013 |

(Continued)

OTHER PUBLICATIONS

"Office Action of Taiwan Counterpart Application", dated May 16, 2022, p. 1-p. 7.

(Continued)

*Primary Examiner* — Than Nguyen
(74) *Attorney, Agent, or Firm* — JCIPRNET

(57) ABSTRACT

A flash memory control method, a flash memory storage device and a flash memory controller are provided. The method includes the following. A flash memory module is instructed to perform a data merge operation to copy first data in a first physical unit into at least one second physical unit. After the first data is copied and before the first physical unit is erased, another programming operation is performed on the first physical unit to change a data storage state of at least a part of memory cells in the first physical unit from a first state into a second state. After the first physical unit is programmed, an erase operation is performed on the first physical unit.

18 Claims, 8 Drawing Sheets

(58) Field of Classification Search
USPC .......................................................... 711/154
See application file for complete search history.

(56) References Cited

U.S. PATENT DOCUMENTS

| 2017/0039141 | A1* | 2/2017 | Yeh | G06F 12/1009 |
| 2017/0228162 | A1* | 8/2017 | Tan | G06F 3/0679 |
| 2020/0409835 | A1* | 12/2020 | Lee | G06F 12/0811 |
| 2020/0412379 | A1* | 12/2020 | Lin | G06F 11/1004 |

FOREIGN PATENT DOCUMENTS

| TW | 201826125 | 7/2018 |
| TW | 202101223 | 1/2021 |

OTHER PUBLICATIONS

"Office Action of Taiwan Counterpart Application", dated Jan. 27, 2022, p. 1-p. 6.
"Office Action of Taiwan Counterpart Application", dated Aug. 17, 2022, p. 1-p. 7.

\* cited by examiner

FLASH MEMORY CONTROL METHOD OF RE-PROGRAMMING MEMORY CELLS BEFORE ERASE OPERATIONS, FLASH MEMORY STORAGE DEVICE AND FLASH MEMORY CONTROLLER

CROSS-REFERENCE TO RELATED APPLICATION

This application claims the priority benefit of Taiwanese application no. 110113805, filed on Apr. 16, 2021. The entirety of the above-mentioned patent application is hereby incorporated by reference herein and made a part of this specification.

BACKGROUND

Technical Field

The disclosure relates to a memory control technology; particularly, the disclosure relates to a flash memory control method, a flash memory storage device and a flash memory controller.

Description of Related Art

Portable electronic devices such as mobile phones and notebook computers have grown rapidly in the past few years, which has led to a rapid increase in consumer demand for storage media. Since a rewritable non-volatile memory module (e.g., flash memory) has properties of non-volatile data, power saving, small size, and non-mechanical structure, it is thus well suitable for being built into the portable electronic devices mentioned above.

In the rewritable non-volatile memory module, memory cells may store data by injecting electric charges into the memory cells. However, the electric charges injected into the memory cells may be lost as data storage time increases, data access operations increase and/or temperature changes. During subsequent erase performed on the memory cells, the lost electric charges may, for example, become against an erase voltage, thus decreasing erase efficiency on the memory cells. Thereafter, when new data needs to be written into the erased memory cells, data write quality may be adversely affected because of factors such as data not fully erased in the memory cells.

SUMMARY

The disclosure provides a flash memory control method, a flash memory storage device and a flash memory controller, in which data write quality after a memory cell is erased is improved.

An exemplary embodiment of the disclosure provides a flash memory control method. The flash memory control method includes the following. A flash memory module in a flash memory storage device is instructed to perform a data merge operation to copy first data in a first physical unit in a plurality of physical units of the flash memory module into at least one second physical unit in the plurality of physical units. After the first data in the first physical unit is copied into the at least one second physical unit and before an erase operation is performed on the first physical unit, a programming operation is performed on the first physical unit again to change a data storage state of at least a part of memory cells in the first physical unit from a first state to a second state. After the first physical unit is programmed, the erase operation is performed on the first physical unit.

An exemplary embodiment of the disclosure also provides a flash memory storage device. The flash memory storage device includes a connection interface unit, a flash memory module and a flash memory controller. The connection interface unit is configured to be coupled to a host system. The flash memory module includes a plurality of physical units. The flash memory controller is coupled to the connection interface unit and the flash memory module. The flash memory controller is configured to perform a data merge operation to copy first data in a first physical unit in the plurality of physical units into at least one second physical unit in the plurality of physical units. After the first data in the first physical unit is copied into the at least one second physical unit and before an erase operation is performed on the first physical unit, the flash memory controller is further configured to perform a programming operation on the first physical unit again to change a data storage state of at least a part of memory cells in the first physical unit from a first state to a second state. After the first physical unit is programmed, the flash memory controller is further configured to perform the erase operation on the first physical unit.

An exemplary embodiment of the disclosure also provides a flash memory controller. The flash memory controller is configured to control a flash memory module. The flash memory module includes a plurality of physical units. The flash memory controller includes a host interface, a memory interface and a memory management circuit. The host interface is configured to be coupled to a host system. The memory interface is configured to be coupled to the flash memory module. The memory management circuit is coupled to a connection interface unit and the flash memory module. The memory management circuit is configured to perform a data merge operation to copy first data in a first physical unit in the plurality of physical units into at least one second physical unit in the plurality of physical units. After the first data in the first physical unit is copied into the at least one second physical unit and before an erase operation is performed on the first physical unit, the memory management circuit is further configured to perform a programming operation on the first physical unit again to change a data storage state of at least a part of memory cells in the first physical unit from a first state to a second state. After the first physical unit is programmed, the memory management circuit is further configured to perform the erase operation on the first physical unit.

In an exemplary embodiment of the disclosure, the programming operation includes programming the first physical unit according to a predetermined data.

In an exemplary embodiment of the disclosure, the programming operation includes programming the first physical unit according to a predetermined programming mode.

In an exemplary embodiment of the disclosure, the predetermined programming mode includes a single-level cell mode In an exemplary embodiment of the disclosure, the programming operation includes converting at least one memory cell in the first physical unit from an erased state into a programmed state.

In an exemplary embodiment of the disclosure, the programming operation is configured to ensure that each memory cell in the first physical unit is in a programmed state before the first physical unit is erased.

Based on the foregoing, after the first data is copied from the first physical unit in the flash memory module into the second physical unit and before an erase operation is performed on the first physical unit, the first physical unit may first be programmed to change the data storage state of at least a part of the memory cells in the first physical unit. After the data storage state of the memory cells is changed, an erase operation may be performed on the first physical unit. Thereby, data write quality after the memory cells in the first physical unit is erased is improved.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Generally speaking, a memory storage device (also referred to as a memory storage system) includes a rewritable non-volatile memory module and a controller (also referred to as a control circuit). The memory storage device may be used together with a host system for the host system to write data into the memory storage device or read data from the memory storage device.

Figure 1:
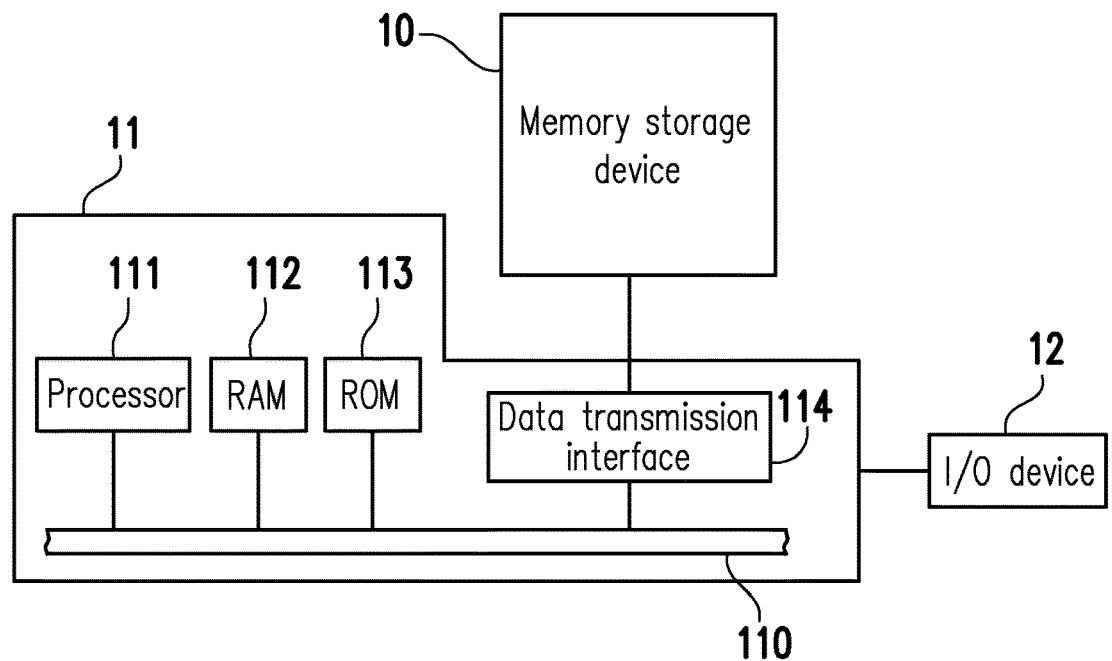
FIG. 1 is a schematic diagram showing a host system, a memory storage device, and an input/output (I/O) device according to an exemplary embodiment of the disclosure.
Figure 2:
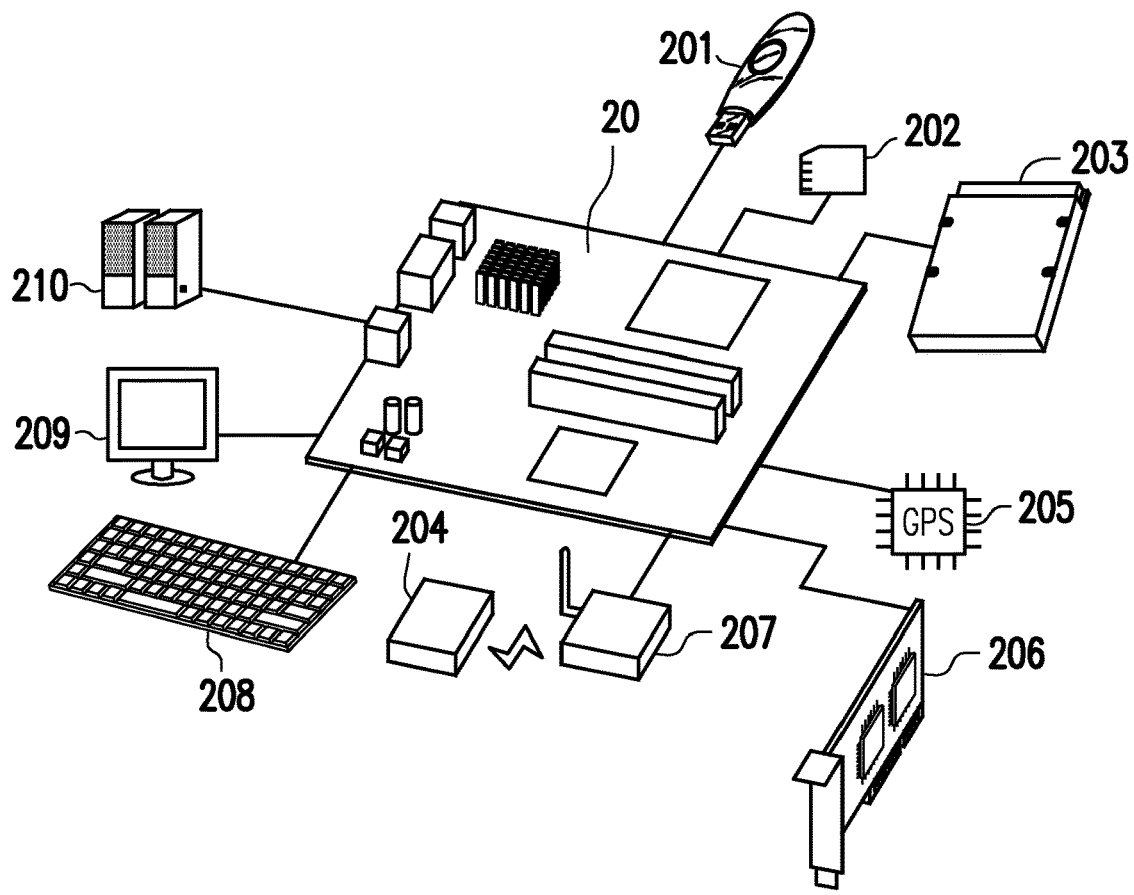
FIG. 2 is a schematic diagram showing a host system, a memory storage device, and an I/O device according to an exemplary embodiment of the disclosure.

FIG. 1 is a schematic diagram showing a host system, a memory storage device, and an input/output (I/O) device according to an exemplary embodiment of the disclosure. FIG. 2 is a schematic diagram showing a host system, a memory storage device, and an I/O device according to an exemplary embodiment of the disclosure.

With reference to FIG. 1 and FIG. 2, a host system 11 may include a processor 111, random access memory (RAM) 112, read only memory (ROM) 113, and a data transmission interface 114. The processor 111, the random access memory 112, the read only memory 113, and the data transmission interface 114 may be coupled to a system bus 110.

In an exemplary embodiment, the host system 11 may be coupled to a memory storage device 10 through the data transmission interface 114. For example, the host system 11 may store data into the memory storage device 10 or read data from the memory storage device 10 through the data transmission interface 114. In addition, the host system 11 may be coupled to an I/O device 12 through the system bus 110. For example, the host system 11 may transmit an output signal to the I/O device 12 or receive an input signal from the I/O device 12 through the system bus 110.

In an exemplary embodiment, the processor 111, the random access memory 112, the read only memory 113, and the data transmission interface 114 may be disposed on a motherboard 20 of the host system 11. The data transmission interface 114 may include one or more data transmission interfaces. Through the data transmission interface 114, the motherboard 20 may be coupled to the memory storage device 10 in a wired or wireless manner.

In an exemplary embodiment, the memory storage device 10 may be, for example, a flash drive 201, a memory card 202, a solid state drive (SSD) 203, or a wireless memory storage device 204. The wireless memory storage device 204 may be, for example, a near-field communication (NFC) memory storage device, a Wireless Fidelity (WiFi) memory storage device, a Bluetooth memory storage device, a Bluetooth Low Energy memory storage device (e.g., iBeacon), or any other memory storage device based on various modes of wireless communication technology. In addition, the motherboard 20 may also be coupled to various I/O devices such as a Global Positioning System (GPS) module 205, a network interface card 206, a wireless transmission device 207, a keyboard 208, a screen 209, or a speaker 210 through the system bus 110. For example, in an exemplary embodiment, the motherboard 20 may access the wireless memory storage device 204 through the wireless transmission device 207.

In an exemplary embodiment, the host system 11 is a computer system. In an exemplary embodiment, the host system 11 may be any system that substantially works with a memory storage device to store data.

Figure 3:
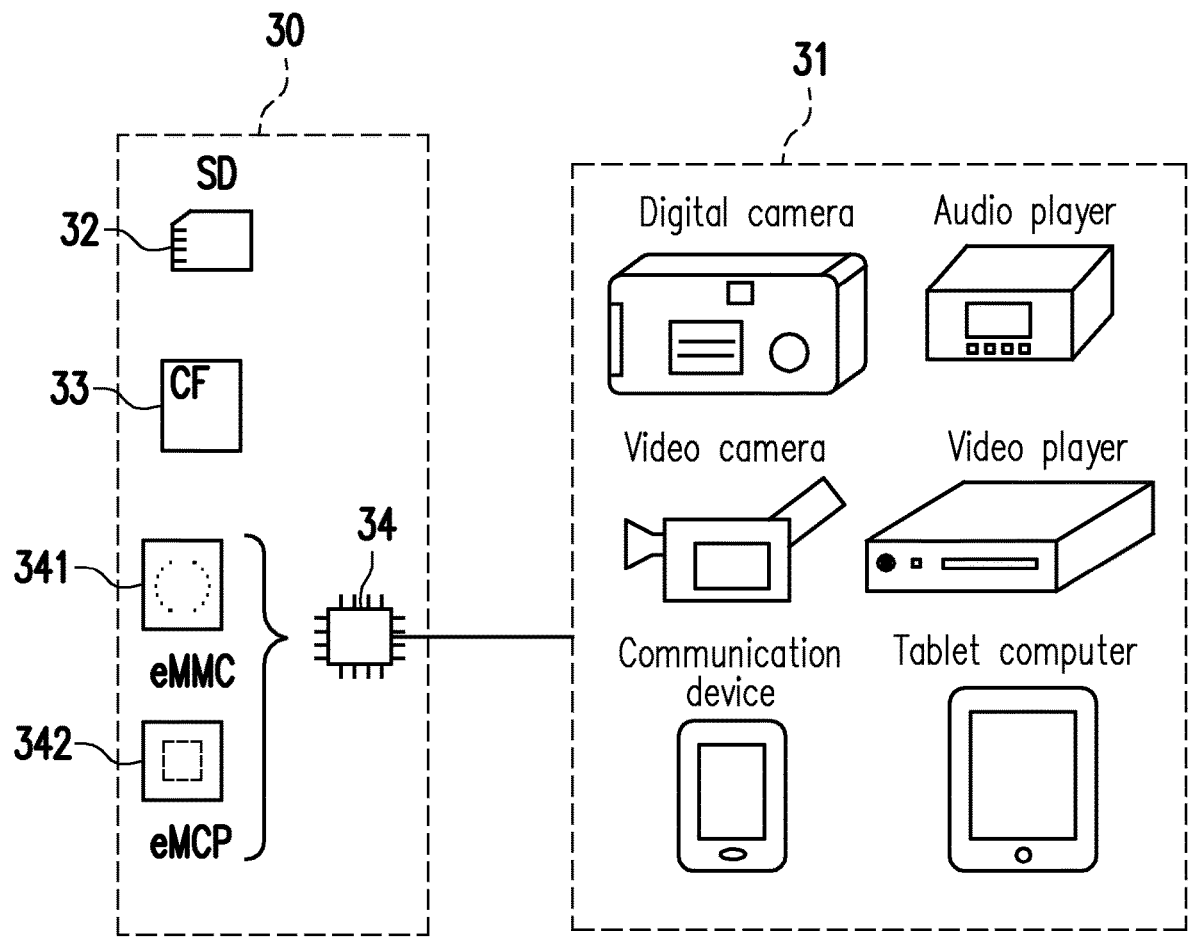
FIG. 3 is a schematic diagram showing a host system and a memory storage device according to an exemplary embodiment of the disclosure.

FIG. 3 is a schematic diagram showing a host system and a memory storage device according to an exemplary embodiment of the disclosure. With reference to FIG. 3, in an exemplary embodiment, a host system 31 may be a system such as a digital camera, a video camera, a communication device, an audio player, a video player, or a tablet computer. A memory storage device 30 may be various non-volatile memory storage devices such as a Secure Digital (SD) card 32, a Compact Flash (CF) card 33, or an embedded storage device 34 used by the host system 31. The embedded storage device 34 includes embedded storage devices in various forms, such as an embedded Multi Media Card (eMMC) 341 and/or an embedded Multi Chip Package (eMCP) storage device 342, which directly couple the memory module to the substrate of the host system.

Figure 4:
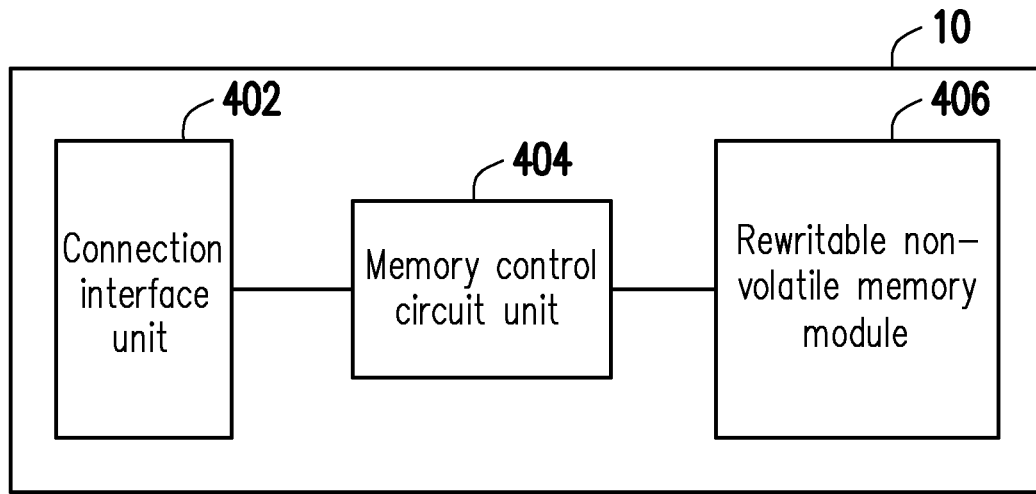
FIG. 4 is a schematic block diagram of a memory storage device according to an exemplary embodiment of the disclosure.

FIG. 4 is a schematic block diagram of a memory storage device according to an exemplary embodiment of the disclosure. With reference to FIG. 4, the memory storage device 10 includes a connection interface unit 402, a memory control circuit unit 404, and a rewritable non-volatile memory module 406.

The connection interface unit 402 is configured to couple the memory storage device 10 with the host system 11. The memory storage device 10 may communicate with the host system 11 through the connection interface unit 402. In an exemplary embodiment, the connection interface unit 402 is compatible with the Serial Advanced Technology Attachment (SATA) standard. In an exemplary embodiment, the connection interface unit 402 may also be compliant with the Parallel Advanced Technology Attachment (PATA) standard, Institute of Electrical and Electronic Engineers (i.e. EE) 1394 standard, Peripheral Component Interconnect Express (PCI Express) standard, and Universal Serial Bus (USB) Standard, SD interface standard, Ultra High Speed-I (UHS-I) interface standard, Ultra High Speed-II (UHS-II) interface standard, Memory Stick (MS) interface standard, MCP interface standard, MMC interface standard, eMMC Interface standard, Universal Flash Storage (UFS) interface standard, eMCP interface standard, CF interface standard, Integrated Device Electronics (IDE) standard or other suitable standards. The connection interface unit 402 may be packaged into the same chip with the memory control circuit unit 404. Alternatively, the connection interface unit 402 may be arranged outside a chip including the memory control circuit unit 404.

The memory control circuit unit 404 is coupled to the connection interface unit 402 and the rewritable non-volatile memory module 406. The memory control circuit unit 404 is configured to execute a plurality of logic gates or control instructions implemented in a hardware form or firmware form and performs operations such as writing, reading, and erasing data in the rewritable non-volatile memory module 406 according to instructions of the host system 11.

The rewritable non-volatile memory module 406 is configured to store data written by the host system 11. The rewritable non-volatile memory module 406 may include a single-level cell (SLC) NAND-type flash memory module (i.e., a flash memory module that stores 1 bit in one memory cell), a multi-level cell (MLC) NAND-type flash memory module (i.e., a flash memory module that stores 2 bits in one memory cell), a triple-level cell (TLC) NAND-type flash memory module (i.e., a flash memory module that stores 3 bits in one memory cell), a quad-level cell (QLC) NAND-type flash memory module (i.e., a flash memory module that stores 4 bits in one memory cell), other flash memory modules, or other memory modules with the same properties.

In the rewritable non-volatile memory module 406, each memory cell stores one or more bits by a voltage change (hereinafter also referred to as a threshold voltage). Specifically, in each memory cell, an electric charge trapping layer is present between a control gate and a channel. By applying a write voltage to the control gate, the amount of electrons in the electric charge trapping layer may be changed, further changing the threshold voltage of the memory cell. This operation of changing the threshold voltage of the memory cell is also referred to as "writing data into the memory cell" or "programming the memory cell". As the threshold voltage changes, each memory cell in the rewritable non-volatile memory module 406 may be in a plurality of storage states. By applying a read voltage, the storage state to which a memory cell belongs may determined, thereby obtaining one or more bits stored in the memory cell.

In an exemplary embodiment, the memory cells of the rewritable non-volatile memory module 406 may constitute a plurality of physical programming units, and the physical programming units may constitute a plurality of physical erasing units. Specifically, the memory cells on the same word line may form one or more physical programming units. If each memory cell stores more than 2 bits, the physical programming units on the same word line may be at least classified into a lower physical programming unit and an upper physical programming unit. For example, the least significant bit (LSB) of a memory cell belongs to the lower physical programming unit, and the most significant bit (MSB) of a memory cell belongs to the upper physical programming unit. Generally speaking, in MLC NAND-type flash memory, the write speed of the lower physical programming unit is greater than the write speed of the upper physical programming unit, and/or the reliability of the lower physical programming unit is higher than the reliability of the upper physical programming unit.

In an exemplary embodiment, the physical programming units are the minimum unit for programming. That is, the physical programming units are the minimum unit for data write. For example, the physical programming units may include a physical page or a physical sector. If the physical programming units are physical pages, the physical programming units may include a data bit region and a redundancy bit region. The data bit region includes a plurality of physical sectors configured to store user data, and the redundancy bit region is configured to store system data (e.g., error correcting codes or other management data). In an exemplary embodiment, the data bit region includes 32 physical sectors, and the size of a physical sector is 512 bytes (B). However, in other exemplary embodiments, the data bit region may also include 8, 16, or more or less physical sectors, and the size of each physical sector may also be greater or smaller. On the other hand, the physical erasing units are the minimum unit of erase. That is, each physical erasing unit includes the minimum number of memory cells that are erased together. For example, the physical erasing units include a physical block.

Figure 5:
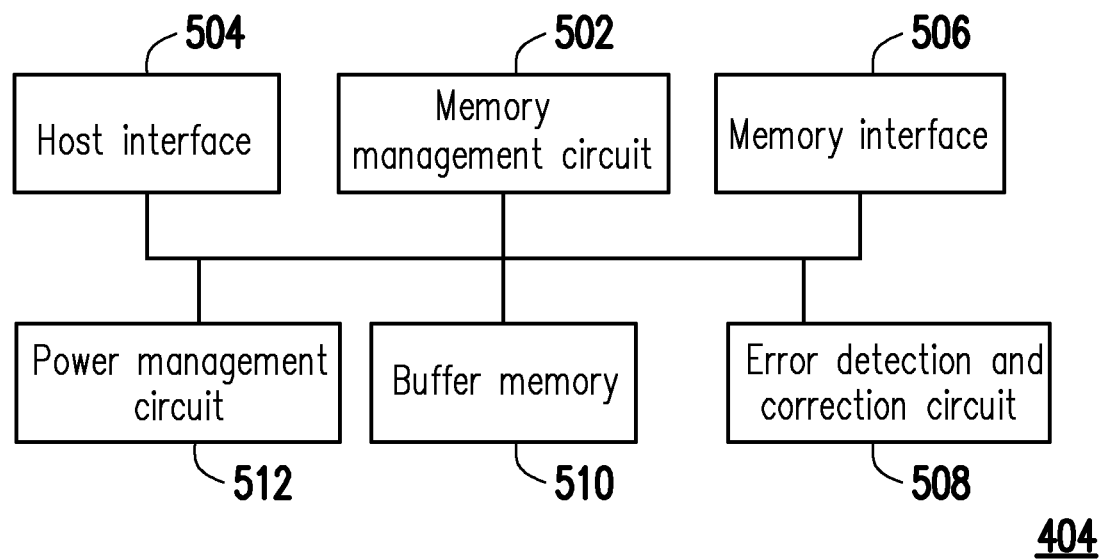
FIG. 5 is a schematic block diagram of a memory control circuit unit according to an exemplary embodiment of the disclosure.

FIG. 5 is a schematic block diagram of a memory control circuit unit according to an exemplary embodiment of the disclosure. With reference to FIG. 5, the memory control circuit unit 404 includes a memory management circuit 502, a host interface 504, a memory interface 506, and an error detection and correction circuit 508.

The memory management circuit 502 is configured to control the overall operation of the memory control circuit unit 404. Specifically, there exist a plurality of control instructions in the memory management circuit 502. During operation of the memory storage device 10, the control instructions are executed to perform operations such as writing, reading, and erasing data. Hereinafter, when the operation of the memory management circuit 502 is descried, the operation of the memory control circuit unit 404 is equivalently described.

In an exemplary embodiment, the control instructions of the memory management circuit 502 are implemented in a firmware form. For example, the memory management circuit 502 is provided with a microprocessor unit (not shown) and read only memory (not shown), and the control instructions are programmed into the read only memory. During operation of the memory storage device 10, the control instructions are executed by the microprocessor unit to perform operations such as writing, reading, and erasing data.

In an exemplary embodiment, the control instructions of the memory management circuit 502 may also be stored in a specific area (e.g., a system region dedicated to storing system data in the memory module) of the rewritable non-volatile memory module 406. In addition, the memory management circuit 502 is provided with a microprocessor unit (not shown), read only memory (not shown), and random access memory (not shown). In particular, there exists a boot code in the read only memory. When the memory control circuit unit 404 is enabled, the microprocessor unit first executes the boot code to load the control instructions stored in the rewritable non-volatile memory module 406 into the random access memory of the memory management circuit 502. After that, the microprocessor unit operates the control instructions to perform operations such as writing, reading, and erasing data.

In an exemplary embodiment, the control instructions of the memory management circuit 502 may also be implemented in a hardware form. For example, the memory management circuit 502 includes a microcontroller, a memory cell management circuit, a memory write circuit, a memory read circuit, a memory erase circuit, and a data processing circuit. The memory cell management circuit, the memory write circuit, the memory read circuit, the memory erase circuit, and the data processing circuit are coupled to the microcontroller. The memory cell management circuit is configured to manage a memory cell or a memory cell group of the rewritable non-volatile memory module 406. The memory write circuit is configured to issue a write instruction sequence to the rewritable non-volatile memory module 406 to write data into the rewritable non-volatile memory module 406. The memory read circuit is configured to issue a read instruction sequence to the rewritable non-volatile memory module 406 to read data from the rewritable non-volatile memory module 406. The memory erase circuit is configured to issue an erase instruction sequence to the rewritable non-volatile memory module 406 to erase data from the rewritable non-volatile memory module 406. The data processing circuit is configured to process data to be written to the rewritable non-volatile memory module 406 and data read from the rewritable non-volatile memory module 406. The write instruction sequence, the read instruction sequence, and the erase instruction sequence may each include one or more programming codes or instruction codes and are configured to instruct the rewritable non-volatile memory module 406 to perform corresponding write, read, and erase operations among other operations. In an exemplary embodiment, the memory management circuit 502 may also issue other types of instruction sequences to the rewritable non-volatile memory module 406 to instruct the rewritable non-volatile memory module 406 to perform corresponding operations.

The host interface 504 is coupled to the memory management circuit 502. The memory management circuit 502 may communicate with the host system 11 through the host interface 504. The host interface 504 may be configured to receive and identify instructions and data transmitted by the host system 11. For example, the instructions and data transmitted by the host system 11 may be transmitted to the memory management circuit 502 through the host interface 504. In addition, the memory management circuit 502 may transmit data to the host system 11 through the host interface 504. In this exemplary embodiment, the host interface 504 is compatible with the SATA standard. However, it should be understood that the disclosure is not limited thereto. The host interface 504 may also be compatible with the PATA standard, IEEE 1394 standard, PCI Express standard, USB standard, SD standard, UHS-I standard, UHS-II standard, MS standard, MMC standard, eMMC standard, UFS standard, CF standard, IDE standard or other suitable data transmission standard.

The memory interface 506 is coupled to the memory management circuit 502 and configured to access the rewritable non-volatile memory module 406. In other words, data to be written into the rewritable non-volatile memory module 406 is converted through the memory interface 506 into a format acceptable by the rewritable non-volatile memory module 406. Specifically, when the memory management circuit 502 is to access the rewritable non-volatile memory module 406, the memory interface 506 will transmit corresponding instruction sequences. For example, the instruction sequences may include a write instruction sequence commanding data be written, a read instruction sequence commanding data be read, an erase instruction sequence indicating data be erased, and corresponding instruction sequences commanding various memory operations (e.g., changing the read voltage level or performing a garbage collection operation, etc.). The instruction sequences are, for example, generated by the memory management circuit 502 and transmitted through the memory interface 506 to the rewritable non-volatile memory module 406. The instruction sequences may include one or more signals, or data on a bus. The signals or data may include instruction codes or programming codes. For example, in the read instruction sequence, information such as a read identification code or a memory address is included.

The error detection and correction circuit (also referred to as a decoding circuit) 508 is coupled to the memory management circuit 502 and configured to perform error detection and correction operations to ensure data correctness. Specifically, when the memory management circuit 502 receives a write instruction from the host system 11, the error detection and correction circuit 508 generates a corresponding error correcting code (ECC) and/or error detecting code (EDC) for data corresponding to the write instruction. In addition, the memory management circuit 502 writes the data corresponding to the write instruction and the corresponding error correcting code and/or error detecting code into the rewritable non-volatile memory module 406. Later, while reading data from the rewritable non-volatile memory module 406, the memory management circuit 502 also reads the error correcting code and/or error detecting code corresponding to the data. Moreover, the error detection and correction circuit 508 performs error detection and correction operations on the read data according to the error correcting code and/or error detecting code.

In an exemplary embodiment, the memory control circuit unit 404 also includes a buffer memory 510 and a power management circuit 512. The buffer memory 510 is coupled to the memory management circuit 502 and configured to temporarily store data and instructions from the host system 11 or data from the rewritable non-volatile memory module 406. The power management circuit 512 is coupled to the memory management circuit 502 and configured to control the power of the memory storage device 10.

In an exemplary embodiment, the memory storage device 10 in FIG. 4 is also referred to as a flash memory device, the rewritable non-volatile memory module 406 is also referred to as a flash memory module, and the memory control circuit unit 404 is also referred to as a flash memory controller for controlling a flash memory module. In an exemplary embodiment, the memory management circuit 502 in FIG. 5 is also referred to as a flash memory management circuit.

Figure 6:
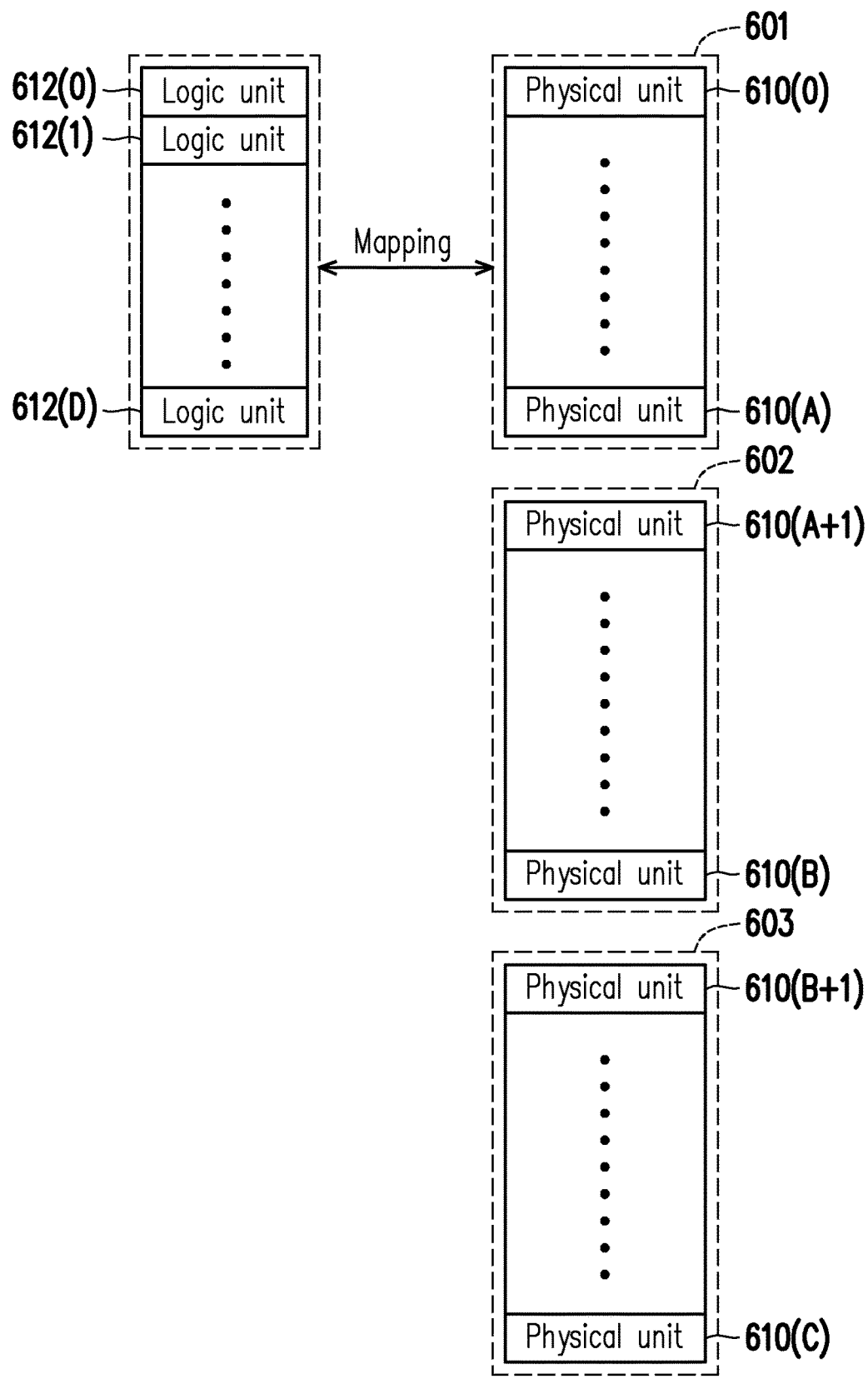
FIG. 6 is a schematic diagram showing managing a rewritable non-volatile memory module according to an exemplary embodiment of the disclosure.

FIG. 6 is a schematic diagram showing managing a rewritable non-volatile memory module according to an exemplary embodiment of the disclosure. With reference to FIG. 6, the memory management circuit 502 may logically group physical units 610(0) to 610(C) in the rewritable non-volatile memory module 406 into a storage region 601, a spare region 602, and a system region 603. In the physical units 610(0) to 610(A) in the storage region 601, data (e.g., user data from the host system 11 in FIG. 1) is stored. For example, the physical units 610(0) to 610(A) in the storage region 601 may store valid data and invalid data. The physical units 610(A+1) to 610(B) in the spare region 602 have not been used to store data (e.g., valid data). The physical units 610(B+1) to 610(C) in the system region 603 is configured to store management information (also referred to as system data), such as a logical-to-physical mapping table, bad block management table, device model, or other types of management information.

When data is to be stored, the memory management circuit 502 may select one physical unit from the physical units 610(A+1) to 610(B) in the spare region 602 and stores data from the host system 11 or from at least one physical unit in the storage region 601 into the selected physical unit. At the same time, the selected physical unit may be associated to the storage region 601. In addition, if a certain physical unit in the storage region 601 does not store valid data (i.e., only storing invalid data), this physical unit may be re-associated to the spare region 602.

In an exemplary embodiment, each physical unit belonging to the storage region 601 is also referred to as a non-spare physical unit, and each physical unit belonging to the spare region 602 is also referred to as a spare physical unit. In addition, a physical unit may include one or more physical erasing units.

The memory management circuit 502 may be provided with logic units 612(0) to 612(D) to be mapped to the physical units 610(0) to 610(A) in the storage region 601. In an exemplary embodiment, each logic unit corresponds to one logical address. For example, one logical address may include one or more logical block addresses (LBA) or other logical management units. In another exemplary embodiment, one logic unit may also correspond to a logic programming unit or a logic erasing unit, or may be formed by a plurality of continuous or discontinuous logical addresses. Moreover, each of the logic units 612(0) to 612(D) may be mapped to one or more physical units. It should be noted that in an exemplary embodiment, it is possible that the memory management circuit 502 is not provided with a logic unit to be mapped to the system region 603, to prevent the management information stored in the system region 603 from modification by the user.

The memory management circuit 502 may record the mapping relationship (also referred to as logical-to-physical mapping information) between the logic unit and the physical unit in at least one logical-to-physical mapping table. The logical-to-physical mapping table is stored in the physical unit of the system region 603. When the host system 11 is to read data from the memory storage device 10 or write data to the memory storage device 10, the memory management circuit 502 may perform a data access operation on the memory storage device 10 according to the logical-to-physical mapping table.

In an exemplary embodiment, valid data is the most updated data belonging to a certain logic unit, while invalid data is not the most updated data belonging to any logic unit. For example, if the host system 11 stores a new piece of data into a certain logic unit and overwrites the old data originally stored in the logic unit (i.e., updating the data belonging to the logic unit), the new piece of data stored into the storage region 601 is the most updated data belonging to this logic unit and is marked as valid, while the overwritten old data may still be stored in the storage region 601 but is marked as invalid.

In an exemplary embodiment, if the data belonging to a certain logic unit is updated, the mapping relationship between the logic unit and the physical unit storing the old data belonging to the logic unit is be removed. Moreover, the mapping relationship between the logic unit and the physical unit storing the most updated data belonging to the logic unit is established. However, in another exemplary embodiment, if the data belonging to a certain logic unit is updated, the mapping relationship between the logic unit and the physical unit storing the old data belonging to the logic unit may still be maintained.

When the memory storage device 10 is shipped from the factory, the total number of physical units belonging to the spare region 602 may a predetermined number (e.g., 30). During operation of the memory storage device 10, more and more physical units are selected from the spare region 602 and associated to the storage region 601 to store data (e.g., user data from the host system 11). Therefore, as the memory storage device 10 is used, the total number of physical units belonging to the spare region 602 gradually decreases.

During operation of the memory storage device 10, the memory management circuit 502 may continually update the total number of physical units belonging to the spare region 602. The memory management circuit 502 may perform a data merge operation according to the number of physical units (i.e., the total number of spare physical units) in the spare region 602. For example, the memory management circuit 502 may determine whether or not the total number of physical units belonging to the spare region 602 is less than or equal to a threshold value (also referred to as a first threshold value). The first threshold value is, for example, 2 or a greater value (e.g., 10), and is not limited by the disclosure. If the total number of physical units belonging to the spare region 602 is less than or equal to the first threshold value, the memory management circuit 502 may perform the data merge operation. In an exemplary embodiment, the data merge operation is also referred to as a garbage collection operation.

In the data merge operation, the memory management circuit 502 may select at least one physical unit (also referred to as a source block) from the storage region 601 and try to copy the valid data from the selected physical unit into another physical unit (also referred to as a target block). The physical unit used to store the copied valid data is selected from the spare region 602 and may be associated to the storage region 601. If the valid data stored in a certain physical unit has been completely copied to the target block, this physical unit may be associated to the spare region 602 and may be erased for subsequent use.

In an exemplary embodiment, the operation of re-associating a certain physical unit from the storage region 601 back to the spare region 602 (or the operation of erasing a certain physical unit) is also referred to as releasing a spare physical unit. By performing the data merge operation, one or more spare physical units is released and the total number of physical units belonging to the spare region 602 gradually increases.

After the data merge operation is started, if the physical unit belonging to the spare region 602 meets a specific condition, the data merge operation may be stopped. For example, the memory management circuit 502 may determine whether or not the total number of physical units belonging to the spare region 602 is greater than or equal to a threshold value (hereinafter also referred to as a second threshold value). For example, the second threshold value may be greater than or equal to the first threshold value. If the total number of physical units belonging to the spare region 602 is greater than or equal to the second threshold value, the memory management circuit 502 may stop the data merge operation. It should be noted that stopping the data merge operation means ending the currently performed data merge operation. After a data merge operation is stopped, if the total number of physical units belonging to the spare region 602 is less than or equal to the first threshold value again, the next data merge operation may be performed again for an attempt to release a new spare physical unit.

Figure 7:
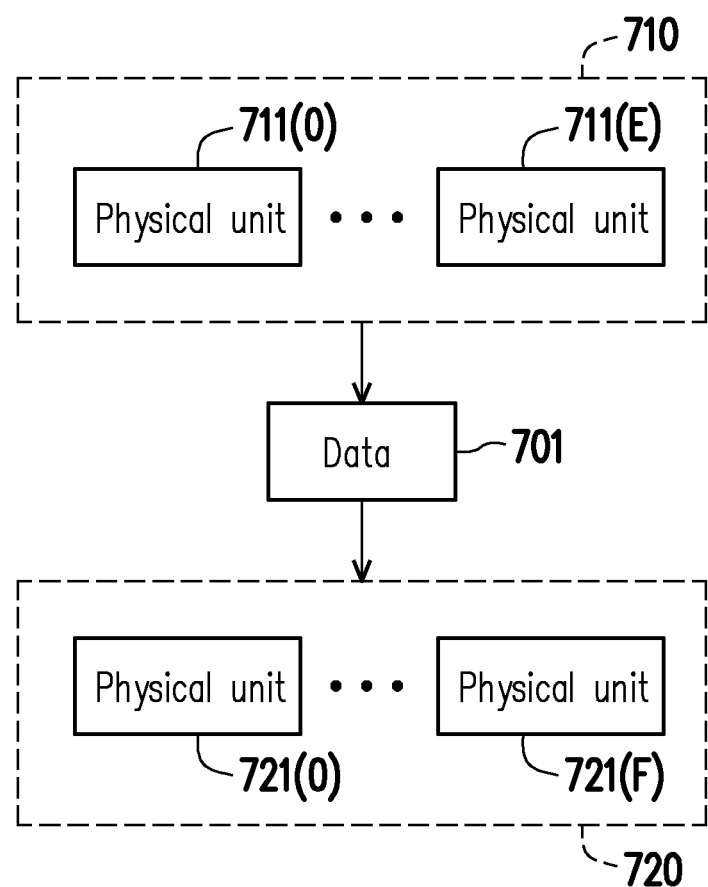
FIG. 7 is a schematic diagram showing a data merge operation according to an exemplary embodiment of the disclosure.

FIG. 7 is a schematic diagram showing a data merge operation according to an exemplary embodiment of the disclosure. With reference to FIG. 7, in the data merge operation, physical units 711(0) to 711(E) (also referred to as first physical units) may be selected as a source block 710, and physical units 721(0) to 721(F) (also referred to as second physical units) may be selected as a target block 720. For example, the physical units 711(0) to 711(E) may be selected from the storage region 601 in FIG. 6, and the physical units 721(0) to 721(F) may be selected from the spare region 602 in FIG. 6. The total number of physical units 711(0) to 711(E) and the total number of physical units 721(0) to 721(F) may each be an arbitrary number, and are not limited by the disclosure.

In the data merge operation, data 701 (also referred to as first data) may be collected from the physical units 711(0) to 711(E) belonging to the source block 710 and copied (e.g., written) into the physical units 721(0) to 721(F) belonging to the target block 720. The copied data 701 may include valid data originally stored in the physical units 711(0) to 711(E).

In an exemplary embodiment, in the data merge operation, in response to the data (i.e., valid data) stored in a certain physical unit in the source block 710 being copied into the target block 720, the memory management circuit 502 may mark the piece of data in the physical unit as invalid. In addition, in response to all the valid data stored in a certain physical unit in the source block 710 having been copied into the target block 720, the memory management circuit 502 may associate this physical unit to the spare region 602 in FIG. 6. The physical unit associated to the spare region 602 may become a new spare physical unit. Before new data is written into the new spare physical unit next time, the spare physical unit needs to be first erased to clear the old data therein.

In an exemplary embodiment, after the data 701 (i.e., first data) in the first physical unit is copied into the second physical unit and before the first physical unit is erased, the memory management circuit 502 may perform the programming operation on the first physical unit again to overwrite at least part of data in the first physical unit. For example, the overwritten data may include invalid data in the first physical unit.

In an exemplary embodiment, the programming operation performed on the first physical unit again, after the data 701 (i.e., first data) in the first physical unit is copied into the second physical unit and before the first physical unit is erased, may be configured to change a data storage state of at least a part of memory cells in the first physical unit from a certain state (also referred to as a first state) to another state (also referred to as a second state). For example, assuming that a certain memory cell in the first physical unit is in the first state (e.g., an erased state) before being erased, then the programming operation may be configured to change the memory cell from the first state (e.g., the erased state) to the second state (e.g., a non-erased state).

In an exemplary embodiment, in the programming operation, the memory management circuit 502 may send a programming instruction sequence (or write instruction sequence) to the rewritable non-volatile memory module 406 to instruct the rewritable non-volatile memory module 406 to program the memory cells in the first physical unit. According to the programming instruction sequence (or write instruction sequence), the rewritable non-volatile memory module 406 may apply a programming voltage (or write voltage) to the memory cells in the first physical unit to overwrite the old data (i.e., invalid data) in the memory cells. It should be noted that in an exemplary embodiment, before the memory cells are erased, the old data (i.e., invalid data) in the memory cells are first overwritten to adjust at least a part of the memory cells in the erased state to the non-erased state (also referred to as a programmed state). After the memory cells are erased, when new data is subsequently written into the memory cells, data write quality is improved.

In an exemplary embodiment, the programming operation may also be automatically performed by the rewritable non-volatile memory module 406, instead of being triggered by the programming instruction sequence (or write instruction sequence) from the memory management circuit 502. For example, in an exemplary embodiment, after the rewritable non-volatile memory module 406 receives an erase instruction sequence from the memory management circuit 502 commanding the first physical unit be erased, and before the first physical unit is actually erased, in response to the erase instruction sequence, the rewritable non-volatile memory module 406 may perform the programming operation on the first physical unit to adjust at least a part of the memory cells in the erased state to the non-erased state. After it is confirmed that the memory cells in the first physical unit are each in the non-erased state (i.e., after the programming operation is performed), the rewritable non-volatile memory module 406 may automatically continue to perform the erase operation commanded by the erase instruction sequence to erase the first physical unit. In other words, in an exemplary embodiment, even if the memory management circuit 502 does not send a programming instruction sequence (or write instruction sequence) to command the programming operation be performed, the rewritable non-volatile memory module 406 may also automatically perform the programming operation on the first physical unit before performing an erase operation on the first physical unit, thereby improving subsequent data write quality on the first physical unit.

In an exemplary embodiment, after the programming operation is performed on the first physical unit (i.e., overwriting the invalid data in the first physical unit), the memory management circuit 502 may perform an erase operation on the first physical unit. For example, in the erase operation, the memory management circuit 502 may send the erase instruction sequence to the rewritable non-volatile memory module 406 to instruct the rewritable non-volatile memory module 406 to apply the erase voltage to the memory cells in the first physical unit to clear the data in the memory cells.

Figure 8:
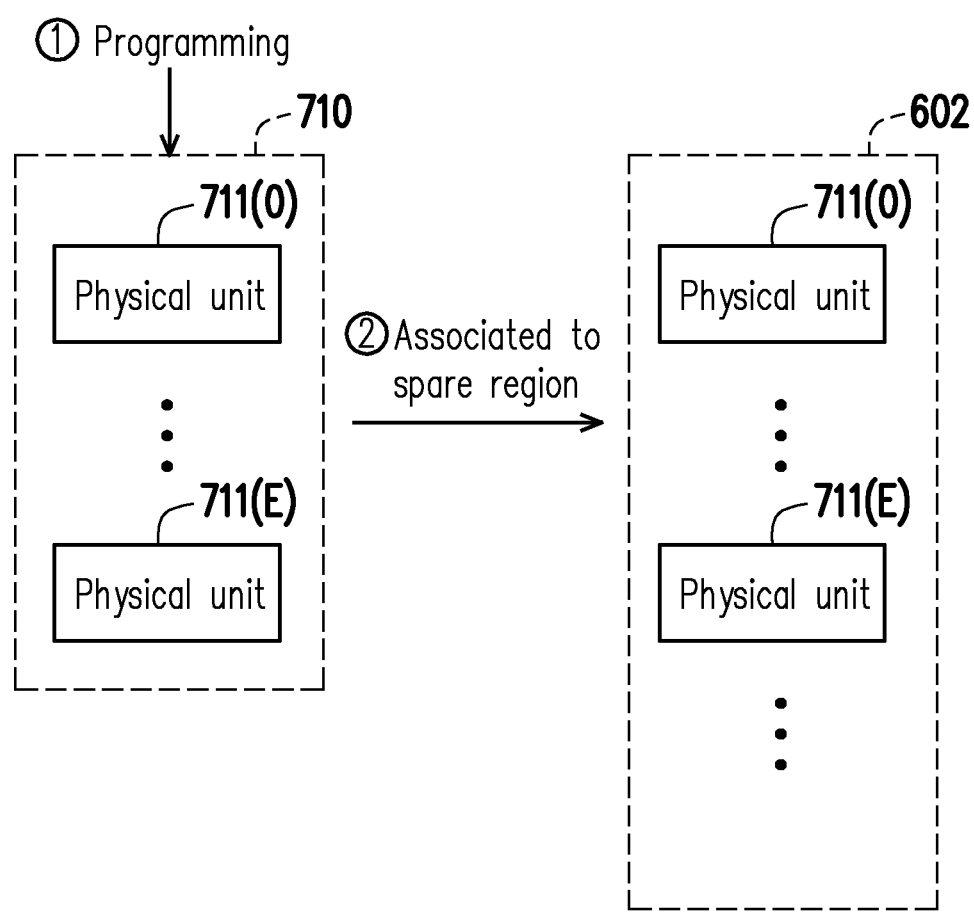
FIG. 8 is a schematic diagram showing programming a first physical unit and associating the first physical unit to a spare region according to an exemplary embodiment of the disclosure.

FIG. 8 is a schematic diagram showing programming a first physical unit and associating the first physical unit to a spare region according to an exemplary embodiment of the disclosure. With reference to FIG. 8, following the exemplary embodiment of FIG. 7, after the valid data stored in the physical units 711(0) to 711(E) (i.e., the first physical units) in the source block 710 is completely copied into the target block 720, all data in the physical units 711(0) to 711(E) is marked as invalid (i.e., becoming invalid data). Then, before the physical units 711(0) to 711(E) are associated to the spare region 602, the physical units 711(0) to 711(E) are first programmed to overwrite the data (i.e., the invalid data) in the physical units 711(0) to 711(E). After the physical units 711(0) to 711(E) are programmed, the physical units 711(0) to 711(E) may be associated to the spare region 602 and may subsequently be erased.

It should be noted that although the exemplary embodiment of FIG. 8 is exemplified by first programming the first physical unit and then associating the first physical unit to the spare region 602 as an example. Nonetheless, in another exemplary embodiment, it is also possible to first associate the first physical unit to the spare region 602 and then program the first physical unit, or to program the first physical unit and associate the first physical unit to the spare region 602 at the same time, as long as it is ensured that the programming operation is performed on the first physical unit before the first physical unit is erased.

In an exemplary embodiment, if the programming operation is not performed on the first physical unit, the memory management circuit 502 may suspend (or temporarily disallow) association of the first physical unit to the spare region 602. In an exemplary embodiment, if the programming operation is not performed on the first physical unit, the memory management circuit 502 may suspend (or temporarily disallow) performing the erase operation on the first physical unit. In an exemplary embodiment, the memory management circuit 502 only performs (or only allows) association of the first physical unit on which the programming operation has been performed to the spare region 602. In an exemplary embodiment, the memory management circuit 502 only performs (or only allows) the erase operation on the first physical unit on which the programming operation has been performed.

In an exemplary embodiment, if the memory cells in the first physical unit to be erased are all in a state of being programmed (i.e., the programmed state), then after the memory cells are erased, when new data is subsequently written into the memory cells, data write quality may be relatively high. On the contrary, if the memory cells in the first physical unit to be erased are not all in the programmed state, then after the memory cells are erased, when new data is subsequently written into the memory cells, the data write quality may be relatively low.

In an exemplary embodiment, the programming operation performed before the first physical unit is erased may be configured to convert at least one memory cell in the first physical unit from the erased state into the programmed state. Alternatively, from another point of view, by first performing the programming operation on the first physical unit before the first physical unit is erased, it may be ensured that each memory cell in the first physical unit is in the programmed state before the first physical unit is erased. Thereby, after the memory cells in the first physical unit are actually erased, when new data is written into the memory cells, data write quality is improved.

In an exemplary embodiment, in the programming operation performed before the first physical unit is erased, the memory management circuit 502 may instruct the rewritable non-volatile memory module 406 to program the first physical unit according to a predetermined data. For example, the predetermined data may be meaningless data or dummy data. For example, the predetermined data is neither user data stored in a host system (e.g., the host system 11 in FIG. 1) nor system data of the memory storage device 10 per se. After the first physical unit is programmed based on the predetermined data, the data in the first physical unit is still invalid data and may wait to be erased.

In an exemplary embodiment, in the programming operation performed before the first physical unit is erased, the memory management circuit 502 may instruct the rewritable non-volatile memory module 406 to program the first physical unit according to a predetermined programming mode. For example, the predetermined programming mode may include a single-level cell (SLC) mode or other programming modes. The predetermined programming mode may be the same as or different from a programming mode used last time for writing user data (i.e., valid data) into the first physical unit.

Figure 9A:
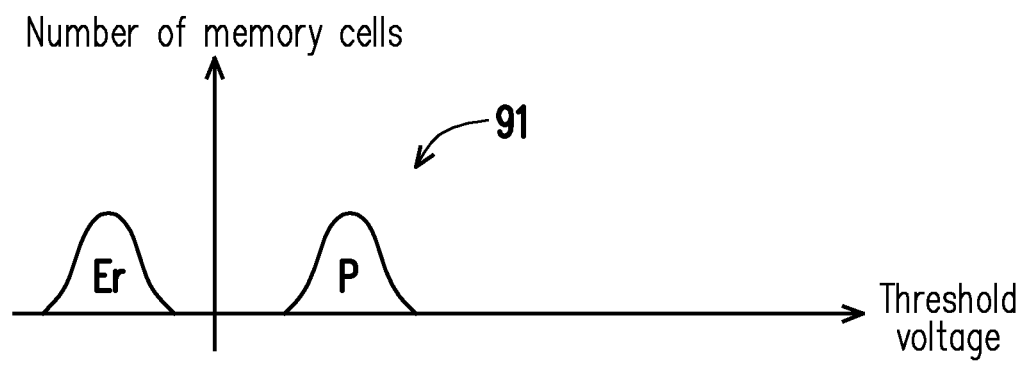
FIG. 9A is a schematic diagram showing a threshold voltage distribution of memory cells in a first physical unit according to an exemplary embodiment of the disclosure.

FIG. 9A is a schematic diagram showing a threshold voltage distribution of memory cells in a first physical unit according to an exemplary embodiment of the disclosure. With reference to FIG. 9A, it is assumed that a certain first physical unit only stores invalid data (or not storing valid data), and the threshold voltage distribution of the plurality of memory cells in the first physical unit is as shown by a distribution 91. In the distribution 91, the current state of a part of the memory cells in the first physical unit belongs to the erased state (Er), and the current state of the other part of the memory cells in the first physical unit belongs to the programmed state (P).

Figure 9B:
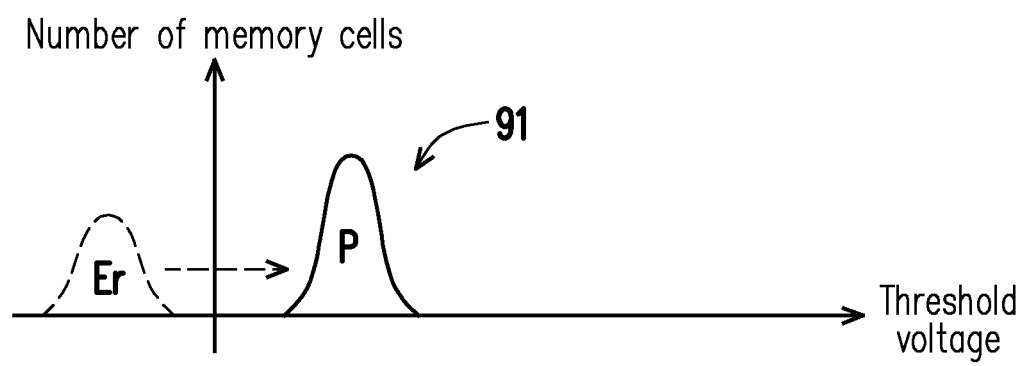
FIG. 9B is a schematic diagram showing a threshold voltage distribution of memory cells in a programmed first physical unit according to an exemplary embodiment of the disclosure.

FIG. 9B is a schematic diagram showing a threshold voltage distribution of memory cells in a programmed first physical unit according to an exemplary embodiment of the disclosure. With reference to FIG. 9B, following the exemplary embodiment of FIG. 9A, after a programming operation is performed on the first physical unit, the memory cells originally in the erased state (Er) in the first physical unit may depart from the erased state (Er). For example, the memory cells departing from the erased state (Er) may be converted into the programmed state (P).

It should be noted that in FIG. 9A and FIG. 9B, a single-level cell (SLC) mode is taken as an example for description of the programming operation. However, in another exemplary embodiment, the programming operation performed before the first physical unit is erased may also be performed based on other programming modes, and is not limited by the disclosure. For example, in an exemplary embodiment, it is only required that the programming operation performed before the first physical unit is erased cause the memory cells originally in the erased state in the first physical unit to depart from the erased state.

Figure 10:
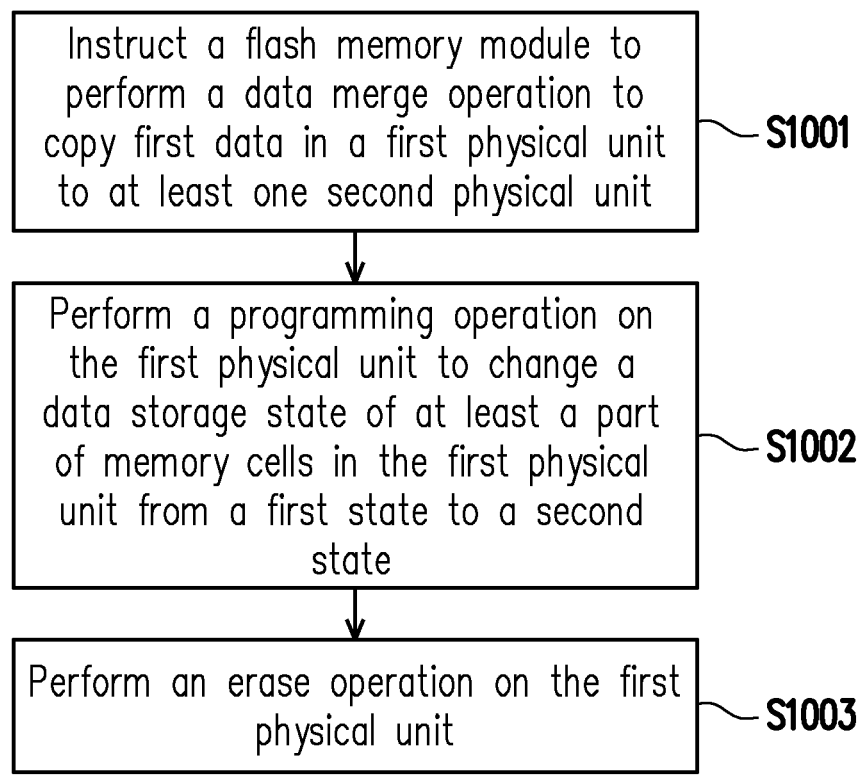
FIG. 10 is a flowchart of a memory control method according to an exemplary embodiment of the disclosure.

FIG. 10 is a flowchart of a memory control method according to an exemplary embodiment of the disclosure. With reference to FIG. 10, in step S1001, a data merge operation is perform on a flash memory module to copy first data in a first physical unit of the flash memory module into at least one second physical unit of the flash memory module. After the first data in the first physical unit is copied into the at least one second physical unit and before an erase operation is performed on the first physical unit, in step S1002, a programming operation is performed on the first physical unit to change a data storage state of at least a part of memory cells in the first physical unit from a first state to a second state. After the first physical unit is programmed, in step S1003, the erase operation is performed on the first physical unit.

Each step in FIG. 10 has been described in detail as above, and will not be repeated herein. Notably, each step in FIG. 10 may be implemented as multiple programming codes or circuits, and is not limited by the disclosure. In addition, the method of FIG. 10 may be used in conjunction with the above exemplary embodiment or may be used alone, and is not limited by the disclosure.

In summary of the foregoing, after the valid data in the first physical unit is completely copied into the target block in the data merge operation, the first physical unit needs to be first programmed, and then (allowed to be) erased. Thereby, when the first physical unit is subsequently retrieved from the spare region to store new data, data write quality is improved.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A flash memory control method, comprising:
    instructing a flash memory module in a flash memory storage device to perform a data merge operation to copy first data in a first physical unit in a plurality of physical units of the flash memory module into at least one second physical unit in the plurality of physical units;
    after copying the first data in the first physical unit into the at least one second physical unit and before performing an erase operation on the first physical unit, performing a programming operation on the first physical unit again to change a data storage state of at least a part of memory cells in the first physical unit from a first state to a second state; and
    after programming the first physical unit, perform the erase operation on the first physical unit.

2. The memory control method according to claim 1, wherein the programming operation comprises:
    programming the first physical unit according to a pre-determined data.

3. The memory control method according to claim 1, wherein the programming operation comprises:
    programming the first physical unit according to a pre-determined programming mode.

4. The memory control method according to claim 3, wherein the predetermined programming mode comprises a single-level cell mode.

5. The memory control method according to claim 1, wherein the programming operation comprises:
    converting at least one of the memory cells in the first physical unit from an erased state into a programmed state.

6. The memory control method according to claim 1, wherein the programming operation is configured to ensure that each of the memory cells in the first physical unit is in a programmed state before erasing the first physical unit.

7. A flash memory storage device, comprising:
    a connection interface unit configured to be coupled to a host system;
    a flash memory module, wherein the flash memory module comprises a plurality of physical units; and
    a flash memory controller coupled to the connection interface unit and the flash memory module,
    wherein the flash memory controller is configured to perform a data merge operation to copy first data in a first physical unit in the plurality of physical units into at least one second physical unit in the plurality of physical units,
    after the first data in the first physical unit is copied into the at least one second physical unit and before an erase operation is performed on the first physical unit, the flash memory controller is further configured to perform a programming operation on the first physical unit again to change a data storage state of at least a part of memory cells in the first physical unit from a first state to a second state, and
    after the first physical unit is programmed, the flash memory controller is further configured to perform the erase operation on the first physical unit.

8. The flash memory storage device according to claim 7, wherein the programming operation comprises:
    programming the first physical unit according to a pre-determined data.

9. The flash memory storage device according to claim 7, wherein the programming operation comprises:
    programming the first physical unit according to a pre-determined programming mode.

10. The flash memory storage device according to claim 9, wherein the predetermined programming mode comprises a single-level cell mode.

11. The flash memory storage device according to claim 7, wherein the programming operation comprises:
    converting at least one of the memory cells in the first physical unit from an erased state into a programmed state.

12. The flash memory storage device according to claim 7, wherein the programming operation is configured to ensure that each of the memory cells in the first physical unit is in a programmed state before the first physical unit is erased.

13. A flash memory controller adapted for controlling a flash memory module, wherein the flash memory module comprises a plurality of physical units, and the flash memory controller comprises:
    a host interface configured to be coupled to a host system;
    a memory interface configured to be coupled to the flash memory module; and
    a memory management circuit coupled to a connection interface unit and the flash memory module,
    wherein the memory management circuit is configured to perform a data merge operation to copy first data in a first physical unit in the plurality of physical units into at least one second physical unit in the plurality of physical units,
    after the first data in the first physical unit is copied into the at least one second physical unit and before an erase operation is performed on the first physical unit, the memory management circuit is further configured to perform a programming operation on the first physical unit again to change a data storage state of at least a part of memory cells in the first physical unit from a first state to a second state, and
    after the first physical unit is programmed, the memory management circuit is further configured to perform the erase operation on the first physical unit.

14. The flash memory controller according to claim 13, wherein the programming operation comprises:
    programming the first physical unit according to a pre-determined data.

15. The flash memory controller according to claim 13, wherein the programming operation comprises:
    programming the first physical unit according to a pre-determined programming mode.

16. The flash memory controller according to claim 15, wherein the predetermined programming mode comprises a single-level cell mode.

17. The flash memory controller according to claim 13, wherein the programming operation comprises:
converting at least one of the memory cells in the first physical unit from an erased state into a programmed state.

18. The flash memory controller according to claim 13, wherein the programming operation is configured to ensure that each of the memory cells in the first physical unit is in a programmed state before the first physical unit is erased.

* * * * *